Jan. 1, 1935.  G. STEVEN  1,986,299
SAFETY VALVE FOR COMPRESSORS
Filed April 12, 1934    3 Sheets-Sheet 1

George Steven
INVENTOR

BY

ATTORNEY

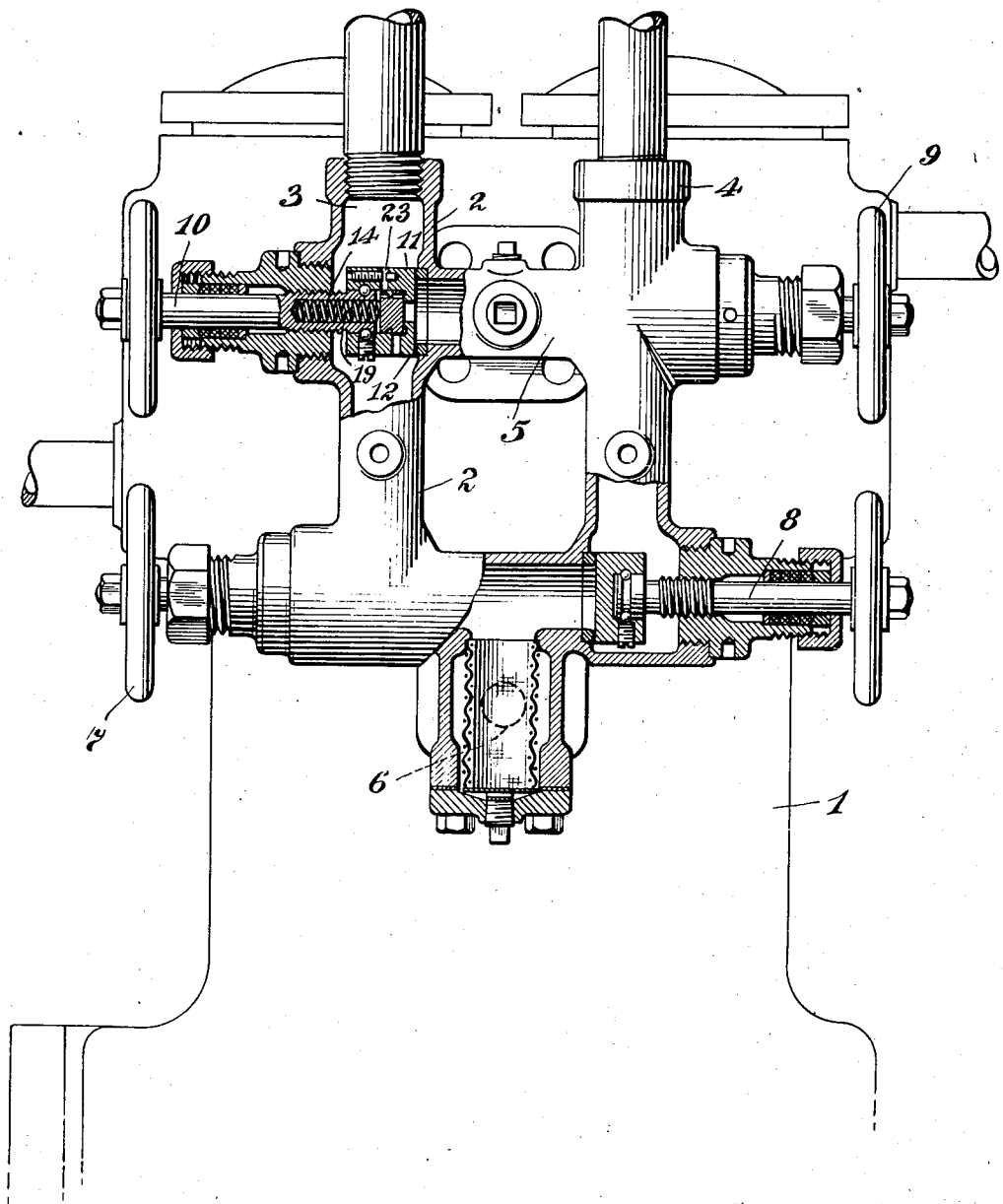

Jan. 1, 1935.                G. STEVEN                1,986,299
                    SAFETY VALVE FOR COMPRESSORS
                  Filed April 12, 1934    3 Sheets-Sheet 3

George Steven
INVENTOR
BY
ATTORNEY

Patented Jan. 1, 1935

1,986,299

UNITED STATES PATENT OFFICE 1,986,299

SAFETY VALVE FOR COMPRESSORS

George Steven, Buffalo, N. Y., assignor to Worthington Pump and Machinery Corporation, New York, N. Y., a corporation of Virginia Application April 12, 1934, Serial No. 720,200

6 Claims. (Cl. 230—22)

This invention relates to compressors and more particularly to safety valves for relatively small size compressors.

An object of the invention is to provide a safety relief valve embodied in the by-pass or unloading valve of a compressor which relief valve will fulfill all of the requirements of a safety relief valve and at the same time will be inexpensive to manufacture and consequently will be particularly adaptable to small sizes of compressors where the selling price is low.

Another object of the invention is to provide a safety relief valve as specified which embodies a means to automatically close the safety valve and permit the compressor to operate normally when the pressure has dropped to a predetermined degree, and also to provide means whereby the degree of pressure drop required for closing the safety valve may be regulated to suit conditions of the particular installation.

With these and other objects in view as may appear from the accompanying specification, the invention consists of various features of construction and combination of parts, which will be first described in connection with the accompanying drawings, showing a safety valve for a compressor of the preferred form, and the features forming the invention will be specifically pointed out in the claims.

In the drawings:

Fig. 2 is an enlarged fragmentary side elevation of the compressor embodying the invention and having parts thereof shown in section.

Figure 3:
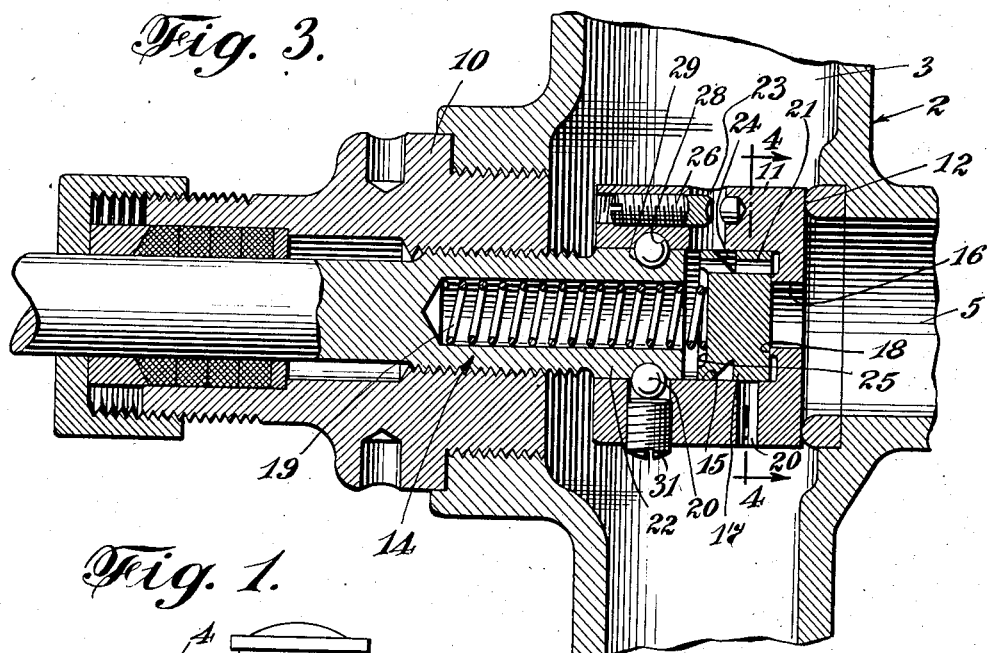
Fig. 3 is an enlarged longitudinal section through the safety valve structure.
Figure 1:
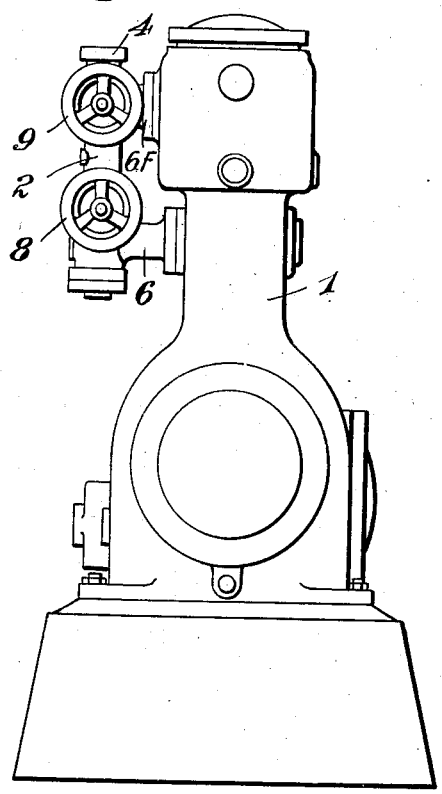
Fig. 1 is an end elevation of compressor embodying the invention.
Figure 4:
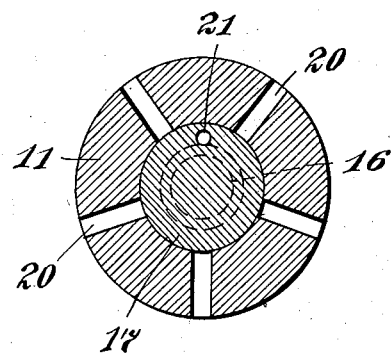
Fig. 4 is a cross section through the safety valve structure taken on the line 4—4 of Fig. 3.
Figure 5:
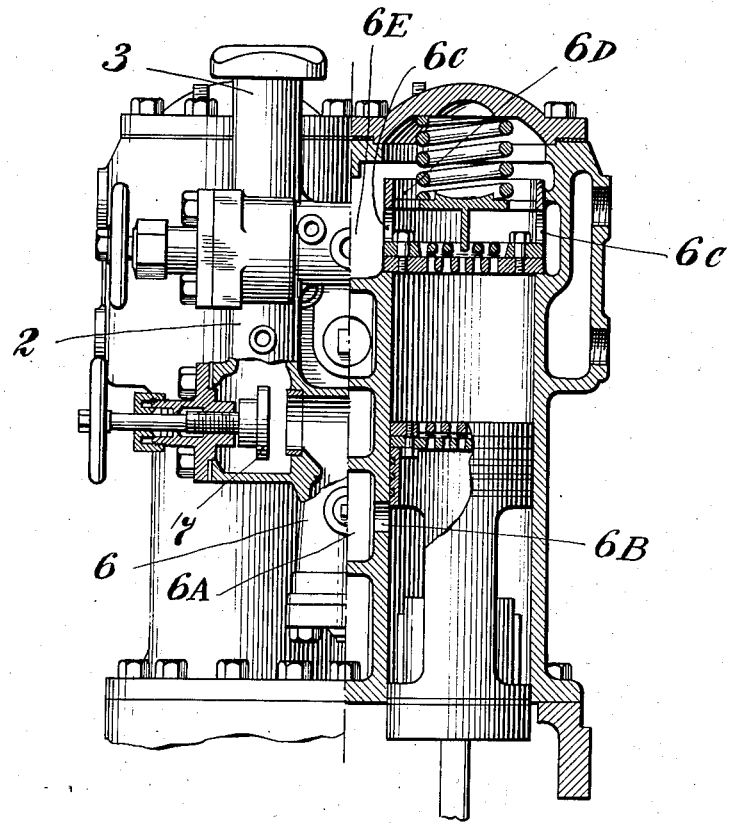
Fig. 5 is a view partly in elevation and partly in section showing the connection of a manifold with the compressor inlet and discharge passages.

Referring more particularly to the drawings, a vertical reciprocating compressor of any approved type is indicated at 1, in the drawings, and it has a manifold 2 thereon which has connection with the supply of suction gas for the compressor through the arm or port 3, and with the discharge line of the compressor through the ported arm 4. The manifold 2 is substantially in the form of a square having by-pass pipe 5 which provides communication between the suction port 3 and the discharge port 4, and it also has communication through the inlet branch 6 with the gas supply for the compressor. Delivery of the gas to be pumped through the manifold 2 to the suction 3 and thence to the compressor is controlled by valve structure 7 which may be of any approved type but is preferably of the same construction as the valve 8 which controls the branch connection between the suction arm 6 and the discharge 4. A discharge valve 9 is also provided for controlling the discharge of the compressor. The manifold 2 is of the usual approved type of manifold commonly used in connection with ammonia gas compressors or the like and its particular construction forms no part of the persent invention. The suction or incoming gas to be compressed enters the arm 3 and passes therethrough, when the valve 7 is open, into the suction or inlet branch 6. From the branch 6 the incoming gas passes into the chamber 6A formed in the compressor casting. From the chamber 6A the incoming gas is drawn into the cylinders of the compressor through the ports 6B, as clearly shown in Fig. 5 of the drawings. After the gas is compressed it is discharged through the ports 6C and space 6D into the discharge passage or chamber 6E and thence through the branch 6F into the by-pass pipe 5. From the by-pass 5 the compressed gas passes, during normal operation of the compressor to the discharge outlet 4.

The manifold 2 has a by-pass valve 10 therein which is manually operated to move the valve disc 11 off the seat 12 to permit by-passing of the fluid pumped between the discharge and suction of the compressor to permit the compressor to operate in an unloaded state when starting, or at any other desired time.

After the compressor is started, the valve 10 is closed which permits the compressor to operate in its normal condition.

The by-pass valve 10 is always closed during normal operation of the compressor and consequently some safety relief means is necessary in case the pressure on the discharge side, or in other words, the pressure of the fluid pumped becomes too high and in the present invention such relief is provided in the form of a safety relief valve generically indicated at 14, which safety relief valve is incorporated in the by-pass valve 10 thereby providing a simple construction of relief valve, which, owing to its cheapness of manufacture, is particularly adaptable for use on small size compressors.

The disc 11 of the by-pass valve 10 is recessed as shown at 15 and a port or opening 16 is provided which opens into the discharge passage connection 5 of the manifold 2 and opens into the recess 15 formed in the valve disc 11. The safety valve disc 17 is positioned within the recess 15 and is held against the valve seat 18 to cut off communication between the discharge of the compressor through the port 4 and branch 5 with the suction ported arm 3 of the compressor. The disc 17 is held seated by means of a spring 19 which is tensioned to hold the valve disc seated until the pressure against the opposite side of the disc, namely the pressure in the discharge passage of the manifold, reaches a degree sufficiently great to overcome the tension of the spring, at which time the valve disc 17 is unseated and the pressure fluid by-passes through port 16 into the recess 15 and out through the transverse radiating ports 20, formed in the valve disc 11 into the manifold 2 in the suction branch thereof and consequently to the suction of the compressor permitting the by-passing of a part of the fluid pumped and reducing the pressure being built up in the discharge line of the compressor.

The disc 17 of the safety valve structure 14 has a plurality of ports 21 formed therein which open into the chamber 15 at the discharge side of the valve disc and open into the space between the disc 17 and the valve stem 22, that is, open into the space at the opposite side of the disc 17 from the discharge side so that when the disc 17 is unseated pressure will be built up behind the valve disc 17 and when this built-up pressure reaches a predetermined degree it, together with the spring 19, will move the disc 17 upon the seat 18 and cut off the by-passing of a part of the fluid pumped. However, to prevent the too-quick closing of the safety valve, a bleed-off port 23 is provided in the disc 11 which has communication with the port 21 through a suitable groove 24 formed in the disc 17 thus permitting a part of the pressure fluid passing through the port 21 to by-pass into the port 3 for retarding the building up of the closing pressure behind the disc 17. If it is so desired the disc 17 may be cut away as shown at 25 to provide the surface acted upon by the closing pressure.

Means are provided in the present invention for controlling or regulating the building up of the closing pressure behind the disc 17, and in the present interpretation of the invention this means comprises an adjustable plug or screw 26 which projects into the bleed-off passage 23 and chokes this passage so that by adjustment of the plug or screw 26 the active bleed-off area of the bleed-off port 23 may be controlled thereby controlling the quantity of pressure fluid bled away from behind the valve with a resultant control of the building up of this closing pressure.

Any suitable means may be provided for holding the stem 22 in the valve disc 11. However, in the present construction the stem and disc are shown provided with co-operating annular grooves 28 and 29 which receive therein suitable retaining balls 30. The balls 30 are held in place and tightened by means of a tightening screw 31.

During operation of a compressor equipped with the improved safety valve, when the pressure in the discharge line of the compressor builds up to a degree dangerous to the continued operation of the compressor, such pressure will overcome the tension of the spring 19 and permit a part of the fluid being compressed to by-pass through the port 16 and the radiating ports 20 to the suction of the compressor. A small part of the by-passing pressure fluid will be delivered into the space behind the safety valve disc, and when this pressure being built up behind the disc of the safety valve together with the tension of the spring 19 becomes greater than the relieved pressure in the discharge of the compressor, the valve disc 17 will be forced against its seat and the compressor will operate normally. In other words, when the pressure drop in the discharge of the compressor is sufficient, the tension of the spring 19 and the pressure built up behind the valve disc 17 will then have reached a sufficient degree of pressure to discontinue the by-passing of part of the fluid pumped.

It will be understood that the invention is not to be limited to the specific construction or arrangement of parts shown, but that these may be modified widely within the invention as defined by the claims.

What is claimed is:

1. In a compressor, the combination with a manifold for the compressor having suction and discharge passages communicating respectively with the suction and discharge ports of the compressor, of a by-pass valve in said manifold between the suction and discharge passages, a safety relief valve carried by said by-pass valve, and yieldable means for holding said safety relief valve seated, whereby when the pressure in the discharge passage of the manifold reaches a predetermined degree the safety valve will be forced off its seat to permit by-passing of a part of the fluid compressed.

2. In a compressor, the combination with a manifold for the compressor having suction and discharge passages communicating respectively with the suction and discharge ports of the compressor, of a by-pass valve in said manifold between the suction and discharge passages, a safety relief valve carried by said by-pass valve, and yieldable means for holding said safety relief valve seated, whereby when the pressure in the discharge passage of the manifold reaches a predetermined degree the safety valve will be forced off its seat to permit by-passing of a part of the fluid compressed, said safety valve acted upon by pressure of part of the fluid by-passed for seating the safety valve when sufficient pressure is built up behind the valve, and means carried by the safety valve for regulating the building up of pressure behind the valve.

3. In a compressor, the combination with a manifold having suction and discharge passageways communicating respectively with the suction and discharge ports of the compressor, of a by-pass valve in said manifold between the suction and discharge passages, a safety relief valve carried by said by-pass valve, tensioned means holding said safety relief valve seated and adapted to be overcome by a predetermined pressure in the discharge passage to unseat the safety relief valve and permit by-passing of a part of the fluid compressed.

4. In a compressor, the combination with a manifold having suction and discharge passageways communicating respectively with the suction and discharge ports of the compressor, of a by-pass valve in said manifold between the suction and discharge passages, a safety relief valve carried by said by-pass valve, tensioned means holding said safety relief valve seated and adapted to be overcome by a predetermined pressure in the discharge passage to unseat the safety relief valve and permit by-passing of a part of the fluid compressed, passages in said relief valve to permit the building up of pressure behind the relief valve during the by-passing of a part of the fluid compressed whereby the pressure behind the relief valve and the tension of said tensioned means becomes greater than the pressure in the discharge passage of the manifold the safety valve will be closed.

5. In a compressor, the combination with a manifold having suction and discharge passageways communicating respectively with the suction and discharge ports of the compressor, of a by-pass valve in said manifold between the suction and discharge passages, a safety relief valve carried by said by-pass valve, tensioned means holding said safety relief valve seated and adapted to be overcome by a predetermined pressure in the discharge passage to unseat the safety relief valve and permit by-passing of a part of the fluid compressed, passages in said relief valve to permit the building up of pressure behind the relief valve during the by-passing of a part of the fluid compressed whereby when the pressure behind the relief valve and the tension of said tensioned means becomes greater than the pressure in the discharge passage of the manifold the safety valve will be closed, and adjustable means for regulating the building up of pressure behind said valve disc.

6. In combination with a compressor, intake and discharge lines connected therewith, a by-pass connecting said lines, a manually operated by-pass valve in said by-pass, a safety relief valve carried by said by-pass valve, yieldable means holding said safety valve seated, said relief valve being seated after opening by the building up of pressure fluid behind it during the by-passing of part of the fluid compressed, and means for regulating the building up of pressure behind said relief valve.

GEORGE STEVEN.